US010491546B2

United States Patent
Gopalakrishnan et al.

(10) Patent No.: US 10,491,546 B2
(45) Date of Patent: Nov. 26, 2019

(54) PROVIDER EDGE ROUTER SYSTEM AND PROVIDER EDGE ROUTER SYSTEM CONTROLLER FOR HYBRID VIRTUALIZATION OF PROVIDER EDGE ROUTER FUNCTIONS

(71) Applicant: AT&T Intellectual Property I, L.P., Atlanta, GA (US)

(72) Inventors: Vijay Gopalakrishnan, Edison, NJ (US); Angela L. Chiu, Holmdel, NJ (US); Oliver Spatscheck, Randolph, NJ (US); Chengwei Wang, Neshanic Station, NJ (US); Yang Xu, Whitehouse Station, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 170 days.

(21) Appl. No.: 14/631,642

(22) Filed: Feb. 25, 2015

(65) Prior Publication Data

US 2016/0248703 A1 Aug. 25, 2016

(51) Int. Cl.
*H04L 12/931* (2013.01)
*G06F 9/46* (2006.01)
(Continued)

(52) U.S. Cl.
CPC .............. *H04L 49/70* (2013.01); *G06F 9/455* (2013.01); *G06F 9/45558* (2013.01); *G06F 9/46* (2013.01);
(Continued)

(58) Field of Classification Search
CPC .......... H04L 49/70; H04L 45/586; G06F 9/00
See application file for complete search history.

(56) References Cited

U.S. PATENT DOCUMENTS 7,586,848 B1 * 9/2009 Gunduzhan ............. H04L 47/10
370/235
7,764,702 B2 7/2010 Yang et al.
(Continued)

FOREIGN PATENT DOCUMENTS

WO WO 2013/165354 11/2013

OTHER PUBLICATIONS

"Virtual Edge Automated Application Delivery & vApps," Netsocket, Jan. 29, 2015, http://www.netsocket.com/how-we-do-it/netsocket-virtual-network-nvn/enterprises.

*Primary Examiner* — Brandon M Renner
*Assistant Examiner* — Jay L Vogel
(74) *Attorney, Agent, or Firm* — Hartman & Citrin LLC

(57) ABSTRACT

A provider edge ("PE") router system and a PE router system controller for hybrid virtualization of PE router functions is disclosed herein. According to one aspect of the concepts and technologies disclosed herein, a PE router system operating at a PE of a network includes an elastic computing system and a plurality of switches. The elastic computing system can include a plurality of hardware resources and a plurality of virtual machines. Each virtual machine of the plurality of virtual machines can utilize at least a portion of the plurality of hardware resources to perform operations. The plurality of virtual machines can include a port virtual machine that provides an interface to a customer edge ("CE") router operating at a CE of the network. The port virtual machine can provide a first set of operations. The plurality of switches can provide a second set of operations.

16 Claims, 7 Drawing Sheets

(51) Int. Cl.
  *G06F 9/455*    (2018.01)
  *H04L 12/713*   (2013.01)
  *H04L 12/939*   (2013.01)

(52) U.S. Cl.
  CPC .. *H04L 45/586* (2013.01); *G06F 2009/45595* (2013.01); *H04L 49/555* (2013.01)

(56) References Cited

U.S. PATENT DOCUMENTS

| | | |
|---|---|---|
| 8,385,341 B2 | 2/2013 | Kern et al. |
| 8,472,324 B1 | 6/2013 | Richardson et al. |
| 8,560,663 B2 | 10/2013 | Baucke et al. |
| 8,619,779 B2 | 12/2013 | Li et al. |
| 8,667,171 B2 | 3/2014 | Guo et al. |
| 8,755,377 B2 | 6/2014 | Nakil et al. |
| 8,787,394 B2 | 7/2014 | Bragg et al. |
| 8,873,398 B2 * | 10/2014 | Kempf ............... H04W 24/02 370/216 |
| 8,924,542 B1 | 12/2014 | Gabrielson et al. |
| 9,021,459 B1 * | 4/2015 | Qu ............... G06F 8/65 710/33 |
| 2010/0046531 A1 * | 2/2010 | Louati ............... H04L 41/0806 370/401 |
| 2010/0107158 A1 * | 4/2010 | Chen ............... G06F 11/1438 718/1 |
| 2011/0149720 A1 * | 6/2011 | Phuah ............... H04L 12/2697 370/216 |
| 2011/0299534 A1 | 12/2011 | Koganti et al. |
| 2012/0147894 A1 * | 6/2012 | Mulligan ............... G06F 9/45533 370/395.53 |
| 2012/0177054 A1 * | 7/2012 | Pati ............... H04L 12/4625 370/395.53 |
| 2014/0056125 A1 * | 2/2014 | Guellal ............... H04L 45/28 370/225 |
| 2014/0064283 A1 | 3/2014 | Balus et al. |
| 2014/0105031 A1 * | 4/2014 | McDysan ............... H04L 45/302 370/242 |
| 2014/0115584 A1 | 4/2014 | Mudigonda et al. |
| 2014/0122681 A1 * | 5/2014 | Imai ............... H04L 41/04 709/223 |
| 2014/0146664 A1 * | 5/2014 | Amante ............... H04L 45/50 370/228 |
| 2015/0074262 A1 * | 3/2015 | Antony ............... H04L 47/125 709/224 |
| 2016/0239350 A1 * | 8/2016 | Kamawat ............... G06F 11/1425 |

* cited by examiner

PROVIDER EDGE ROUTER SYSTEM AND PROVIDER EDGE ROUTER SYSTEM CONTROLLER FOR HYBRID VIRTUALIZATION OF PROVIDER EDGE ROUTER FUNCTIONS

BACKGROUND

Network service providers ("NSPs") are companies that provide network services to customers. Some services that NSPs might provide include internet access, wired telecommunications services, wireless telecommunications services, data services, video services, and other services. The network edge of an NSP provides an entry point where customers' devices can connect to the NSP's network to access network services such as voice, data, video, and/or other services. Specialized routers called provider edge routers control ingress and egress traffic to an NSP's network.

SUMMARY

Concepts and technologies disclosed herein are directed to a provider edge ("PE") router system and a PE router system controller for hybrid virtualization of PE router functions. According to one aspect of the concepts and technologies disclosed herein, a PE router system operating at a PE of a network includes an elastic computing system and a plurality of switches. The elastic computing system can include a plurality of hardware resources and a plurality of virtual machines. Each virtual machine of the plurality of virtual machines can utilize at least a portion of the plurality of hardware resources to perform operations. The plurality of virtual machines can include a port virtual machine that provides an interface to a customer edge ("CE") router operating at a customer edge of the network. The port virtual machine can provide a first set of operations. The plurality of switches can provide a second set of operations.

In some embodiments, the first set of operations provided by the port virtual machine can include one or more computationally-intensive operations. A computationally-intensive operation can include an operation performed in accordance with one or more routing protocols, including, but not limited to, border gateway protocol ("BGP"). For example, a computationally-intensive operation can include the port virtual machine sending one or more BGP routing messages to the CE router and/or receiving one or more BGP routing messages from the CE router. A routing message can inform a customer associated with the CE router and the NSP of what network(s), server(s), endpoint(s), and the like that are reachable via each other and can inform each component where to route traffic. A message exchange between the port virtual machine and the CE router can identify the correct set of information to be exchanged, can format the set of information, and can execute exchange of the set of information. Based upon the exchanged information, the port virtual machine can construct one or more internal data structures in which to capture the exchanged information. The amount of information can benefit from the computational power of the virtual machine compared to dedicated hardware routers that typically do not have capabilities to perform with similar performance.

The computationally-intensive operations can utilize, at least in part, a routing table. A routing table can contain information about how to reach one or more endpoints within a network and/or across multiple networks. For example, if a customer has offices in three locations and is connected to three port virtual machines (one for each location—A, B, and C), each port virtual machine can have information about the endpoint(s) reachable via the other. For example, port virtual machine A not only can have knowledge of servers behind the CE router to which the port virtual machine A is connected, port virtual machine A can also have knowledge of servers behind CE routers connected to port virtual machine B and port virtual machine C. Thus, when port virtual machine A receives an IP packet that is destined to a specific server, port virtual machine A can reference the routing table to determine whether to utilize port virtual machine B or port virtual machine C for routing packets to the server. In summary, using a routing table, the port virtual machine can have different route choices available for routing packets to a given destination. The port virtual machine can utilize the routing table to identify a best next hop destination to reach the given destination. The computationally-intensive operations can utilize, at least in part, a routing protocol state. For example, in BGP, the routing protocol state can utilize a finite state machine that consists of six states: an idle state, a connect state, an active state, an open_sent state, an open_confirm state, and an established state. The routing table described above can be updated as the routing protocol state changes.

In some embodiments, the second set of operations provided by the plurality of switches can include switching-intensive operations. A switching-intensive operation can include a packet forwarding operation. For example, when a packet arrives from the CE router, the packet can be forwarded to the port virtual machine. A switching-intensive operation can include modifying one or more packet headers, including removing, adding, or replacing headers.

In some embodiments, the plurality of virtual machines also can include a centralized virtual machine that performs a third set of operations. The third set of operations can include route processing operations. The centralized virtual machine can function as a conduit between the port virtual machine and a remaining portion of the network. The centralized virtual machine can utilize protocols such as multi-protocol label switching ("MPLS") and label distribution protocol ("LDP") to identify the labels to be used by a packet based upon the source and destination of the packet.

In some embodiments, the PE router system can include a PE router system controller. The PE router system can include a processing unit that executes a load balance module to balance a load between the plurality of virtual machines, between the plurality of switches, and/or between one or more of the virtual machines and one or more of the switches. In some embodiments, the load balance module can balance a load in accordance with one or more policies.

According to another aspect of the concepts and technologies disclosed herein, a PE router system controller includes a processing unit and a memory. The memory can include instructions that, when executed by the processing unit, cause the processing unit to perform operations. The operations can include extracting customer configuration information from a source router. The customer configuration information can be extracted from the source router in response to the PE router system controller detecting a failure of the source router, or a portion thereof, such as a port virtual machine that provides connectivity to at least one CE router. The operations also can include instantiating a target router, which can include a new PE router, or a portion thereof, such as a port virtual machine.

In some embodiments, the target router includes a logical PE router in a PE router system. The logical PE router can include a virtual machine that is executed by one or more hardware resources of an elastic computing system. The logical PE router also can include a switch. The virtual machine can perform computationally-intensive operations. The switch can perform switching-intensive operations.

In some embodiments, the operations also can include reconfiguring connectivity of a network to incorporate the target router into the network in place of the source router. In some embodiments, the operations also can include testing a connection to a customer associated with the customer configuration information. In some embodiments, the operations also can include balancing a load between the virtual machine and switch in accordance with one or more policies.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Concepts and technologies disclosed herein are directed to a router platform that provides logical provider edge ("PE") router functionality. The router platform can include a distributed system of one or more switches and one or more servers. The switch/switches and server(s) might be interconnected in various ways depending upon the cost-reliability trade-off that a network service provider ("NSP) wants to achieve. Customers can use devices to connect to customer edge ("CE") routers, which, in turn, can connect to the router platform via a unique or shared virtual machine ("VM"). Each customer might connect to one or more unique VMs or shared VMs depending upon the NSP's policy/policies. For example, if the NSP wants to provide flexibility to the customer at the cost of VMs, the NSP might choose to assign one customer connection per VM. On the other hand, the NSP might choose to combine multiple customer connections to one VM trading flexibility for utilization. The VMs to which customers connect can be considered analogous to ports on a traditional router.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1A:
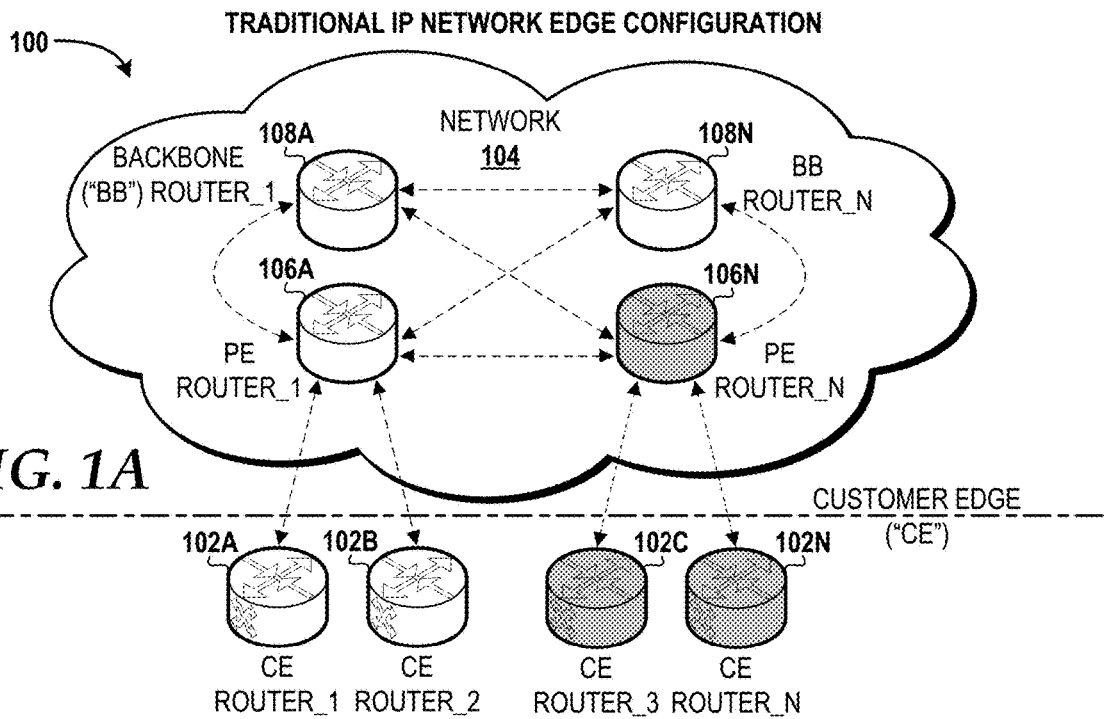
FIG. 1A is a block diagram illustrating aspects of a traditional Internet protocol ("IP") network edge configuration.

Turning now to FIG. 1A, a block diagram illustrating aspects of a traditional internet protocol ("IP") network edge configuration 100 will be described. The illustrated traditional IP network edge configuration 100 includes a plurality of customer edge ("CE") routers 102A-102N (collectively, "CE routers 102"). The CE routers 102 can be located on a customer premises (e.g., a business or home) and can provide an ethernet interface between a customer's network, such as a local area network ("LAN") (not shown), and a network service provider's ("NSP's") network 104 ("network 104") via a plurality of provider edge ("PE") routers 106A-106N (collectively, "PE routers 106") located at the edge of the network 104. The network 104 can include one or more networks, including, for example, one or more access networks, one or more core networks, one or more backbone networks, or combinations thereof. The PE routers 106, in turn, are in communication with a plurality of backbone ("BB") routers 108A-108N (collectively, "BB routers 108"). The PE routers 106 and the BB routers 108 are also shown in communication with each other. Other routers, not shown, can be incorporated into the traditional IP network edge configuration 100.

The PE router_1 106A is shown as being in communication with the CE router_1 102A and the CE router_2 102B. The PE router_N 106N is shown as being in communication with the CE router_3 102C and the CE router_N 102N. In the illustrated example, the PE router_N 106N has failed. The reason for the failure might be a hardware, software, and/or firmware issue. The reason for the failure might be a malicious attack such as a distributed denial of service ("DDOS") attack. The PE router_N 106N might fail for other reasons. In any case, when the PE router_N 106N fails, the CE router_3 102C and the CE router_N 102N are disconnected from the network 104, and therefore are no longer able to communicate with the network 104 to access services provided, at least in part, by the network 104. As such, each of the PE routers 106 in the traditional IP network edge configuration 100 represents a single point of failure for connections to one or more of the CE routers 102.

The concepts and technologies disclosed herein include a router platform that provides logical PE router functionality through a distributed system of one or more switches and one or more servers as will be described in greater detail herein. The router platform allows logical PE routers, or portions thereof, to be instantiated on-demand or migrated to mitigate or eliminate the effects of failures, such as the failure scenario described above. Moreover, the concepts and technologies disclosed herein can allow instantiation or migration to upgrade, downgrade, add, remove, or otherwise change one or more services provided to a customer associated with a logical PE router or a portion thereof. In this manner, customers that utilize, at least in part, the router platform can be undisturbed even when failures, upgrades, and/or other changes are needed for other customers.

Figure 1B:
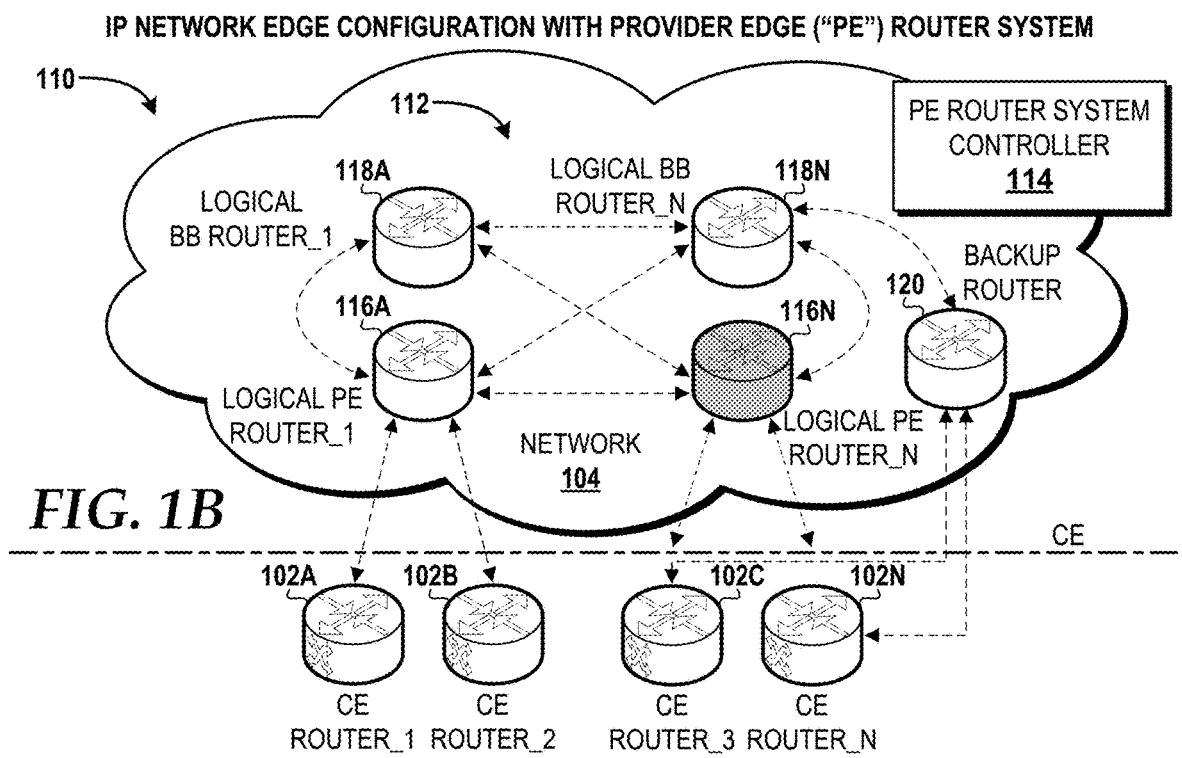
FIG. 1B is a block diagram illustrating aspects of an IP network edge configuration with a provider edge ("PE") router system, according to an illustrative embodiment of the concepts and technologies disclosed herein.

Turning now to FIG. 1B, the aforementioned router platform is exemplified in an IP network edge configuration with PE router system 110. The illustrated IP network edge configuration with PE router system 110 includes the CE routers 102 introduced above. As described above, the CE routers 102 can be located on a customer premises (e.g., a business or home) and can provide an ethernet interface between a customer's network, such as a LAN (not shown), and the network 104. Instead of the PE routers 106 located at the edge of the network 104 in the traditional IP network edge configuration 100, the IP network edge configuration with PE router system 110 includes a PE router system 112 and a PE router system controller 114.

In the illustrated embodiment, the PE router system 112 includes a plurality of logical PE routers 116A-116N (collectively, "logical PE routers 116"). Each of the logical PE routers 116 can include one or more virtual machines ("VMs") (best shown in FIG. 3). The VMs can function as ports of a PE router, wherein each port is assigned to one or more CE components, such as one or more of the CE routers 102. Additional details in this regard will be described herein below with reference to FIG. 3.

The logical PE routers 116, in turn, are in communication with a plurality of logical BB routers 118A-118N (collectively, "logical BB routers 118"). The logical PE routers 116 and the logical BB routers 118 are also shown in communication with each other, although the specific network configuration may be different depending upon the requirements of particular implementations. In some embodiments, the BB routers 108 can be implemented in place of or in addition to the logical BB routers 118. As such, the illustrated embodiment should not be construed as being limiting in any way.

The logical PE router_1 116A is shown as being in communication with the CE router_1 102A and the CE router_2 102B. The logical PE router_N 116N is shown as being in communication with the CE router_3 102C and the CE router_N 102N. In the illustrated example, the logical PE router_N 116N or a portion thereof has failed. The logical PE router_N 116N might fail for various reasons, some of which are mentioned above. In any case, when the logical PE router_N 116N fails, the CE router_3 102C and the CE router_N 102N are disconnected from the network 104, and therefore are no longer able to communicate with the network 104 to access services provided, at least in part, by way of the network 104.

In response to a failure of the logical PE router_N 116N or a portion thereof, the PE router system controller 114 can instantiate a new logical PE router, such as a backup router 120, or can divert traffic from the CE router_3 102C and the CE router_N 102N to another logical PE router, such as the logical PE router_1 116A. The PE router system controller 114 can configure the backup router 120 to function the same as or similar to the logical PE router_N 116N, and in this manner, the backup router 120 can functionally replace the logical PE router_N 116N to mitigate or eliminate any downtime that might be experienced due to a similar failure in the traditional IP network edge configuration 100. Although the backup router 120 is shown only in communication with the logical BB router_N 118N, the backup router 120 can be in communication with the logical PE router_1 116A and the logical BB router_1 118A and/or other logical PE and/or BB routers (not shown).

Alternatively or additionally, the PE router system controller 114 can instantiate a new logical PE router, such as the backup router 120, or can divert traffic from the CE router_3 102C and the CE router_N 102N to another logical PE router, such as the logical PE router_1 116A prior to the failure of the logical PE router_N 116N. For example, the PE router system controller 114 can analyze network traffic and can determine to instantiate a new logical PE router or divert traffic in response to the analysis providing information related to a possible failure of the logical PE router_N 116N. In this manner, the PE router system controller 114 can minimize the possibility of a complete failure of the logical PE router_N 116N. In either of the above embodiments, the PE router system controller 114 can function, at least in part, as a global controller to control multiple logical PEs 116.

In some embodiments, the PE router system controller 114 can additionally or alternatively function as a more granular controller to control the instantiation of per customer VMs and/or merging VMs operating within one or more of the logical PE routers 116. In this manner, the PE router system controller 114 can minimize impact of disruptions since failures can be addressed on a per customer basis. Similarly, updates and maintenance can be performed on a per customer basis.

Figure 2:
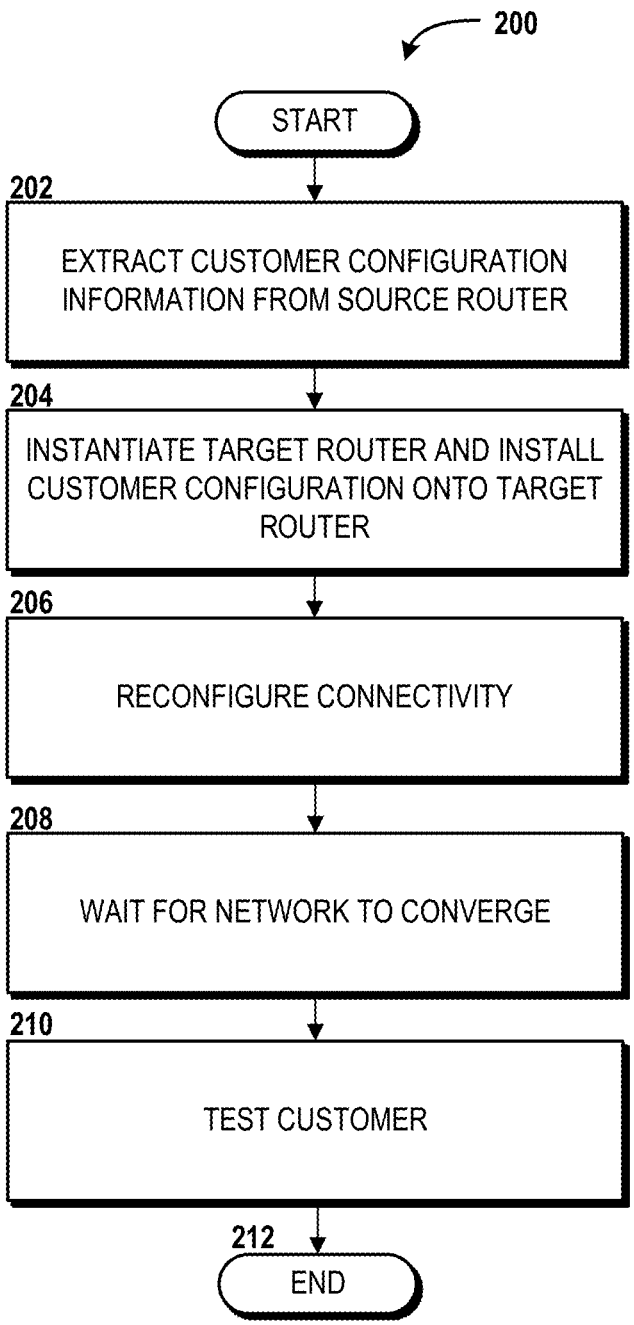
FIG. 2 is a flow diagram illustrating aspects of a method for instantiating a logical PE router or a portion thereof, according to an illustrative embodiment of the concepts and technologies disclosed herein.

Turning now to FIG. 2, aspects of a method 200 for instantiating a logical PE router or a portion thereof will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, servers, routers, switches, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor, a processor one or more computing systems, devices, engines, switches, routers, or components disclosed herein to perform operations. It should be understood that the performance of one or more operations may include operations executed by one or more virtual processors at the instructions of one or more of the aforementioned hardware processors.

The method 200 will be described with reference to FIG. 2 and further reference to FIG. 1B. The method 200 begins at operation 202, where the PE router system controller 114 extracts customer configuration information from a source router. The customer configuration information can include, but is not limited to, IP addresses, routing protocols being used to exchange routing information, access control rules, rate limits, queuing policies, buffer sizes, security policies, combinations thereof, and the like.

The PE router system controller 114 can extract the customer configuration information from the source router at any time, or in response to a stimulus such as, for example, a failure of the source router, an upgrade to the source router, a downgrade to the source router, an added service, a removed service, or any other change to the source router and/or the service(s) the source router provides. Alternatively, the PE router system controller 114 can extract the customer configuration information from a customer configuration backup store (not shown), which might be included as part of the router system controller 114, a component of the PE router system 112, or a standalone component. Turning briefly to FIG. 1B, the source router might be the logical PE router_N 116N or a portion thereof. This example will be used to further illustrate the remaining operations of the method 200, but should not be construed as being limiting in any way.

From operation 202, the method 200 proceeds to operation 204, where the PE router system controller 114 instantiates one or more target routers, such as the backup router 120, in the example shown in FIG. 1B. Also at operation 204, the PE router system controller 114 can install the customer configuration information onto the target router(s) to configure the target router(s) to communicate with one or more CE routers. In the example shown in FIG. 1B, the backup router 120 can be configured to communicate with the CE router_3 102C and the CE router_N 102N in the same or a functionally similar manner as the logical PE router_N 116N prior to the stimulus. As an alternative to operation 204, the customer configuration information can be migrated from the source router to a target router that has already been instantiated.

From operation 204, the method 200 proceeds to operation 206, where the PE router system controller 114 can coordinate reconfiguration of connectivity between the source router and the target router(s). Reconfiguration of the connectivity between the source router and the target router(s) can vary depending upon the specific technology utilized. In the case of ethernet, for example, reconfiguration can include reconfiguration of one or more virtual local area networks ("VLANs") at one or more switches between the CE and the PE of the network 104.

From operation 206, the method 200 proceeds to operation 208, where the PE router system controller 114 waits for the network to converge after the connectivity has been reconfigured. During the operation 208, the router system controller 114 can wait for one or more network protocols, such as border gateway protocol ("BGP"), to be utilized to cause one or more components of the network 104 to perform one or more operations that allow the exchange of reachability information between the CE and the PE of the network 104. For example, the CE learns which destinations are reachable via the network 104. Similarly, for example, the NSP learns all the server addresses that are in the customer's network behind the CE.

From operation 208, the method 200 proceeds to operation 210, where the PE router system controller 114 instructs the target router to test communications with the customer(s) associated with the customer configuration information. Operation 210 can include checking to see if packets can flow between the CE and the PE via the target router. A check can be performed using standard tools like "ping" or by waiting for any data to be exchanged between the two entities, for example. Other techniques known to those skilled in the art are contemplated.

From operation 210, the method 200 proceeds to operation 212. The method 200 ends at operation 212.

Figure 3:
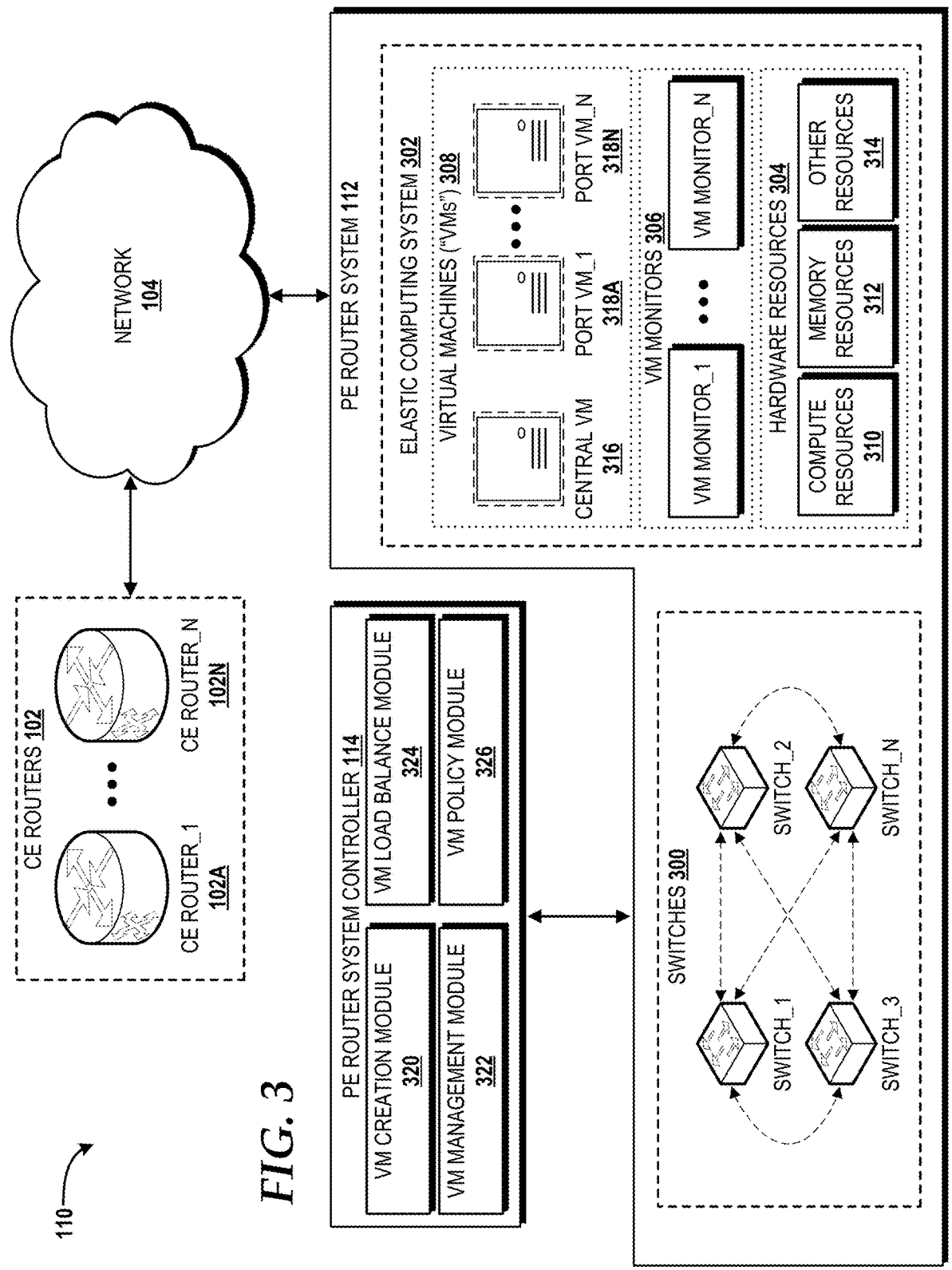
FIG. 3 is a block diagram illustrating additional aspects of the IP network edge configuration with the PE router system, according to an illustrative embodiment.

Turning now to FIG. 3, a block diagram illustrating additional aspects of the IP network edge configuration with PE router system 110 introduced in FIG. 1B will be described, according to an illustrative embodiment. While connections are shown between some of the components illustrated in FIG. 3, it should be understood that some, none, or all of the components illustrated in FIG. 3 can be configured to interact with one another to carry out various operations described herein. Thus, it should be understood that FIG. 3 and the following description are intended to provide a general understanding of a suitable environment in which various aspects of embodiments can be implemented, and should not be construed as being limiting in any way.

The illustrated IP network edge configuration with PE router system 110 includes the PE router system 112, the PE router system controller 114, the network 104, and the CE routers 102 first introduced in FIG. 1B. In the illustrated example, the PE router system controller 114 is shown in communication with the PE router system 112, which, in turn, is shown in communication with the CE routers 102 via the network 104. It should be understood, however, that alternative configurations are contemplated. For example, the PE router system controller 114 may be a component of the PE router system 112, or vice versa. The PE router system controller 114 and the PE router system 112 may operate on or as part of the network 104 such as in the example shown in FIG. 1B. The CE routers 102, instead of operating at the CE of the network 104, may alternatively operate as one or more virtual machines ("VMs") within the PE router system 112 or another system (not shown). As such, the illustrated configuration should not be construed as being limiting in any way.

The PE router system 112, in some embodiments, is built utilizing one or more switches, one or more servers, and one or more VMs running on the servers, as will be described in greater detail below. The switches and servers, in some embodiments, are commodity hardware components. The PE router system 112 can provide routing functionality via a combination of switches and servers to take advantage of the available compute power of the servers and fast switching capabilities of the switches. In one implementation, each router port can map to a VM running on a server. If the router is used on a network edge, such as the PE routers described above, the VM can represent a customer port and can be used to provide customized service for the associated customer. This hybrid approach provides cost saving and efficiency while significantly increasing flexibility and manageability compared to existing router designs, including existing router designs that utilize virtualization. For scalability, a logically centralized VM can be leveraged to perform route processing and control plane communication operations with the network 104, while port VMs can host routing tables and routing protocol states for each router port. In this manner, route computations and other computationally intensive operations can be performed by the servers instead of the switches and allow for the selective offload forwarding of customer traffic to the switches, thereby leveraging the strengths of the servers as well as the switches. The PE router system controller 114 can manage the PE router system 112 by balancing load across the switches and servers. The PE router system controller 114 also can manage failure and handle provisioning of logical routers, such as the logical PE routers 116 and the logical BB routers 118. The PE router system controller 114 can perform other operations described herein.

The illustrated PE router system 112 is a distributed system that includes a plurality of switches 300 ("switches") and an elastic computing system (colloquially known as a "cloud") 302. The switches 300 and the elastic computing system 302 together provide the routing functionality of one or more logical PE routers, such as the logical PE routers 116 shown in FIG. 1B. In this manner, the PE router system 112 can take advantage of the fast switching capabilities of the switches 300 and the compute power of the elastic computing system 302.

The switches 300 can perform one or more switching-intensive operations. A switching-intensive operation can include a packet forwarding operation. For example, when a packet arrives from a CE router, the packet can be forwarded to the appropriate port VM. A switching-intensive operation can include modifying one or more packet headers, including removing, adding, or replacing headers. A switching-intensive operation can include, but is not limited to, multiprotocol label switching ("MPLS") operations, virtual network creation and management operations, other protocol-specific operations, combinations thereof, and the like.

The illustrated elastic computing system 302 includes hardware resources 304, one or more VM monitors 306, and VMs 308. The hardware resources 304, in the illustrated embodiment, include one or more compute resources 310, one or more memory resources 312, and one or more other resources 314.

The compute resource(s) 310 can include one or more hardware components that perform computations to calculate routes, process data, and/or to execute computer-executable instructions of one or more application programs, operating systems, and/or other software. The compute resource(s) 310 can include one or more central processing units ("CPUs") configured with one or more processing cores. The compute resource(s) 310 can include one or more graphics processing units ("GPUs") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resource(s) 310 can include one or more discrete GPUs. In some other embodiments, the compute resource(s) 310 can include CPU and GPU components that are configured in accordance with a co-processing CPU/GPU computing model, wherein the sequential part of an application executes on the CPU and the computationally-intensive part is accelerated by the GPU. The compute resource(s) 310 can include one or more field-programmable gate arrays ("FPGAs"). The compute resource(s) 310 can include one or more system-on-chip ("SoC") components along with one or more other components, including, for example, one or more of the memory resources 312, and/or one or more of the other resources 314. In some embodiments, the compute resource(s) 310 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resource(s) 310 can be or can include one or more hardware components architected in accordance with an ARM architecture, available for license from ARM HOLDINGS of Cambridge, United Kingdom. Alternatively, the compute resource(s) 310 can be or can include one or more hardware components architected in accordance with an x86 architecture, such an architecture available from INTEL CORPORATION of Mountain View, Calif., and others. Those skilled in the art will appreciate the implementation of the compute resource(s) 310 can utilize various computation architectures, and as such, the compute resource(s) 310 should not be construed as being limited to any particular computation architecture or combination of computation architectures, including those explicitly disclosed herein.

The memory resource(s) 312 can include one or more hardware components that perform storage operations, including temporary and/or permanent storage operations. In some embodiments, the memory resource(s) 312 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 310.

The other resource(s) 314 can include any other hardware resources that can be utilized by the compute resources(s) 310 and/or the memory resource(s) 312 to perform operations described herein. The other resource(s) 314 can include one or more input and/or output processors (e.g., network interface controller or wireless radio), one or more modems, one or more codec chipsets, one or more pipeline processors, one or more fast Fourier transform ("FFT") processors, one or more digital signal processors ("DSPs"), one or more speech synthesizers, networking components, combinations thereof, and the like.

The hardware resources 304 can be virtualized by one or more of the VM monitors 306 (also known as "hypervisors") to create one or more virtual resources. The VM monitors 306 can be or can include software, firmware, and/or hardware that alone or in combination with other software, firmware, and/or hardware, creates one or more virtual resources, including the VMs 308. The illustrated VMs 308 include a logically centralized VM ("central VM") 316 and a plurality of port VMs 318A-318N (collectively, "port VMs 318").

The central VM 316 can be configured to perform route processing and control plane operations. The central VM 316 can function as a conduit between the port VMs 318 and a remaining portion of the network 104. The central VM 316 can utilize protocols such as multi-protocol label switching ("MPLS") and label distribution protocol ("LDP") to identify the labels to be used by a packet based upon the source and destination of the packet.

The port VMs 318 can each host one or more routing tables and routing protocol states for each logical PE router. Turning briefly to FIG. 1B, the logical PE router_1 116A can be implemented by the PE router system 112, and each router port for the logical PE router_1 116A can be mapped to one of the port VMs 318 to provide customized services for the associated customer(s). For example, the logical PE router_1 116A can be implemented by the PE router system 112 via two of the port VMs 318, one of the port VMs 318 dedicated to the CE router_1 102A and another one of the port VMs 318 to the CE router_2 102B.

The port VMs 318 can be configured to perform customized computations for each customer. For example, today, if an NSP wants to inspect packets flowing via a customer's port, the NSP can deploy a deep packet inspection ("DPI") device in connection with the router that includes the customer's port, since the router does not have DPI capability. Deploying DPI devices next to each router is not cost effective for the NSP, and in some instances may even be impossible. For this reason, NSPs often deploy DPI devices at designated locations, and traffic that the NSP would like to inspect is diverted to these locations. This routing scheme not only adds complexity but also affects customer traffic because of increased latency. With the PE router system 112, computationally-intensive operations are performed by the VMs 308, and for this reason, DPI can be embodied as a software program executed by one or more of the VMs 308. For example, the central VM 316 can execute DPI software for one or more customers associated with the port VMs 318, or the port VMs 318 can execute DPI software. The VMs 308 also can utilize at least a portion of the memory resources 312 to turn on caching and/or to provide content distribution like services to customers. Since each customer is isolated, the PE router system 112 allows for customized services to be offered for each customer without impacting other customers on the same platform. Similarly each customer's service can be updated or modified at any time without impact or negligible impact and without requiring permission from all customers on the logical router. For this reason, the PE router system 112 can manage PE router functions differently from how traditional routers are managed.

Since each customer's state is contained in one of the port VMs 318, the customer's "connection"—that is, the particular port VM associated with the customer—can be moved between different servers (different resources of the hardware resources 304) on the same logical PE router. For example, if the NSP wants to turn on computationally-intensive operations in one VM, such as the port VM_1 318A, and the operations will affect performance of other VMs, such as the port VM_N 318N (and hence other customers), the PE router system controller 114 can determine to move the port VM_1 318A to a lightly loaded or free portion of the hardware resources 304 using a VM migration technology, and then start the computationally-intensive operations at the new location. Similarly, if the traffic load of VMs changes such that the load on different portions of the hardware resources 304 is unbalanced, the PE router system controller 114 can determine to move VMs to rebalance the load.

A computationally-intensive operation can include an operation performed in accordance with one or more routing protocols, including, but not limited to, BGP. For example, a computationally-intensive operation can include a port virtual machine sending one or more BGP routing messages to a CE router and/or receiving one or more BGP routing messages from the CE router. A routing message can inform a customer associated with the CE router and the NSP of what network(s), server(s), endpoint(s), and the like that are reachable via each other and can inform each component where to route traffic. A message exchange between the port virtual machine and the CE router can identify the correct set of information to be exchanged, can format the set of information, and can execute exchange of the set of information. Based upon the exchanged information, the port virtual machine can construct one or more internal data structures in which to capture the exchanged information. The amount of information can benefit from the computational power of the virtual machine compared to dedicated hardware routers that typically do not have capabilities to perform with similar performance.

The computationally-intensive operations can utilize, at least in part, a routing table. A routing table can contain information about how to reach one or more endpoints within a network and/or across multiple networks. For example, if a customer has offices in three locations and is connected to three port virtual machines (one for each location—A, B, and C), each port virtual machine can have information about the endpoint(s) reachable via the other. For example, port virtual machine A not only can have knowledge of servers behind the CE router to which the port virtual machine A is connected, port virtual machine A can also have knowledge of servers behind CE routers connected to port virtual machine B and port virtual machine C. Thus, when port virtual machine A receives an IP packet that is destined to a specific server, port virtual machine A can reference the routing table to determine whether to utilize port virtual machine B or port virtual machine C for routing packets to the server. In summary, using a routing table, the port virtual machine can have different route choices available for routing packets to a given destination. The port virtual machine can utilize the routing table to identify a best next hop destination to reach the given destination. The computationally-intensive operations can utilize, at least in part, a routing protocol state. For example, in BGP, the routing protocol state can utilize a finite state machine that consists of six states: an idle state, a connect state, an active state, an open_sent state, an open_confirm state, and an established state. The routing table described above can be updated as the routing protocol state changes.

The PE router system 112 can be designed to protect all customers from being affected by failures and maintenance events. If the NSP knows of scheduled maintenance on at least a portion of the hardware resources 304 and/or one or more of the switches 300, the NSP can determine to start migrating the customers connected thereto by moving VMs to different hardware resources of the hardware resources 304. The NSP can then take the affected hardware resources and/or switch(es) down for the scheduled maintenance to be performed. Even in the case that a VM needs software updates, the update process only affects the specific customer whose VM is being upgraded. In the event of a failure where there was no prior indication that allows the NSP to react, the failures will be localized. If and when a server becomes unoperational, the VMs on that server will be affected, however, the server's condition will not affect customers on other servers in the same logical PE. Customers that are impacted can be quickly brought up by instantiating new VMs on other existing servers. Since the individual port VMs 318 are lightweight, new port VMs can be instantiated quickly, and therefore connectivity can be restored for customers much faster than with traditional routers.

The illustrated PE router system controller 114 includes a plurality of modules that can each include computer-executable instructions that, when executed by one or more processing units (best shown in FIG. 6), can cause the PE router system controller 114 to perform operations. In particular, the illustrated PE router controller 114 includes a VM creation module 320, a VM management module 322, a VM load balance module 324, and a VM policy module 326. In some embodiments, one or more of these modules can be executed by one or more of the VMs 308 and/or one or more of the hardware resources 304 of the elastic computing system 302. In other embodiments, such as the illustrated embodiment, the PE router system controller 114 can be a standalone component that includes one or more processing units to execute instructions included in the modules and can interact with the PE router system 112 to control one or more operations of the PE router system 112.

The VM creation module 320 can create the VMs 308 and/or can instruct one or more of the VM monitors 306 to create the VMs 308. The VM creation module 320 can intelligently select upon which of the hardware resources 304 to create one or more of the VMs 308. According to one approach, the VM creation module 320 can select a portion of the hardware resources 304 that have a load below a threshold that identifies the portion of the hardware resources 304 (e.g., a particular server) to be in a low load state. For example, each of the compute resources 310 may have a utilization percentage, and threshold utilization values can be assigned to specific utilization percentages to identify varying utilization levels such as low, medium, or high, or the like. According to another approach, the VM creation module 320 can select a portion of the hardware resources 304 (e.g., a particular server) that has at least a minimum capacity of compute, memory, and other resources (e.g., networking resources) to support one or more of the VMs 308.

The VM management module 322 can manage the VMs 308. In particular, the VM management module 322 can monitor the VMs 308 for failures and can react to these failures appropriately. For example, in response to a failure, the VM management module 322 can instruct the VM creation module 320 to create one or more new VMs to handle the load from one or more failed VMs. The VM management module 322 also can monitor the VMs 308 for load imbalance and can instruct the VM load balance module 324 to rebalance loads. Many approaches can be used in both the failure and load-balancing functions. The VM policy module 326 can provide a policy-driven mechanism for determining the course of action in response to failure events and imbalance events. An NSP associated with the PE router system controller 114 can specify one or more policies to be applied in response to such events. When an event occurs, the PE router system controller 114 can utilize the VM policy module 326 to determine one or more applicable policies and can act upon the policies accordingly. In some embodiments, a policy can specify one or more conditional actions, and thus can enable different actions to be taken depending on different conditions. A policy can specify where VMs should be created, how load should be balanced, what to do under different failure conditions, which flows to offload to the VMs 308 or to one or more of the switches 300. Other policies could specify the periodicity of taking backups of customer configurations and approaches for dynamically turning up services to customers (e.g., in the same VM or instantiate a new VM and migrate customer to the new VM).

Figure 4:
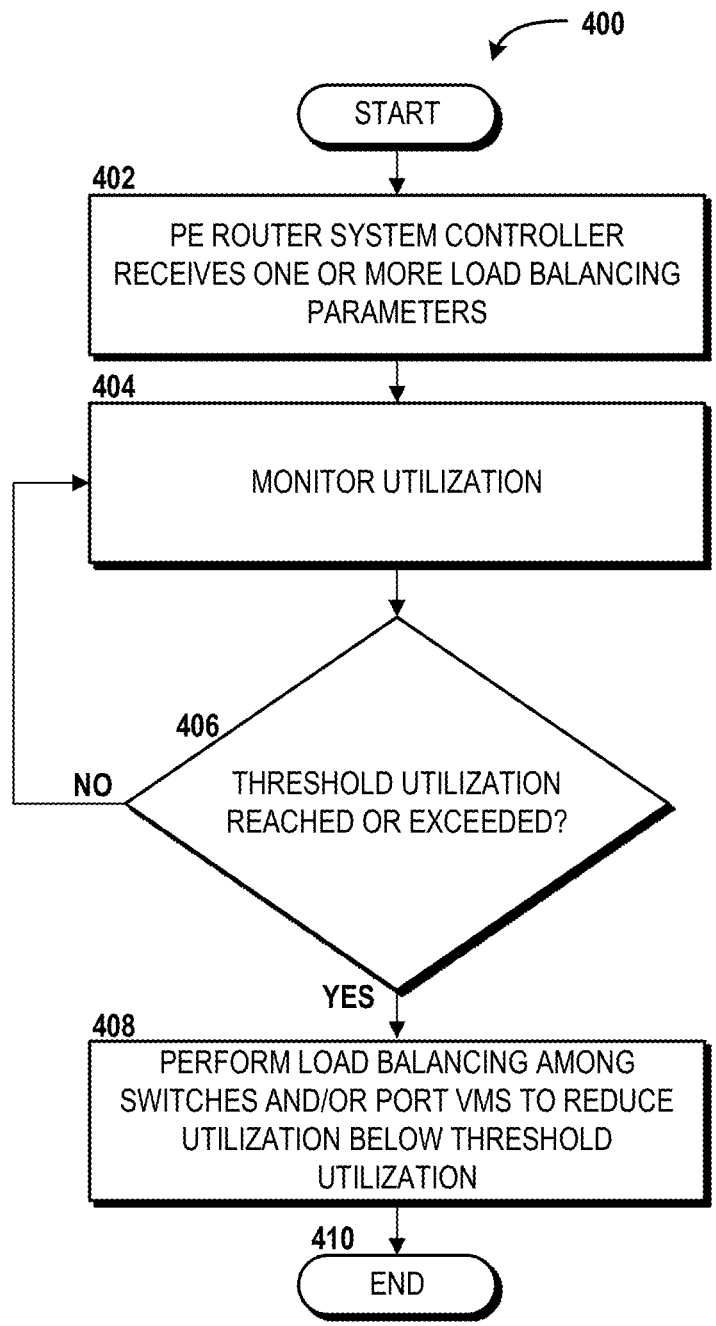
FIG. 4 is a flow diagram illustrating aspects of a method for balancing a load within the PE router system, according to an illustrative embodiment.

Turning now to FIG. 4, aspects of a method 400 for balancing a load within the PE router system 112 will be described, according to an illustrative embodiment. The method 400 will be described from the perspective of the PE router system controller 114 executing the VM load balance module 324.

The method 400 begins at operation 402, where the PE router system controller 114 receives one or more load balancing parameters to be considered by the VM load balance module 324. The load balancing parameters can include parameters associated one or more of the switches 300, the central VM 316, one or more of the port VMs 318, or some combination thereof. Moreover, the load balancing parameters can be or can relate to utilization, capacity, NSP requirements, combinations thereof, and the like.

From operation 402, the method 400 proceeds to operation 404, where the PE router system controller 114 monitors utilization of one or more of the switches 300, the central VM 316, one or more of the port VMs 318, or some combination thereof. From operation 404, the method 400 proceeds to operation 406, where the PE router system controller 114 determines whether a threshold utilization has been reached or exceeded. If, at operation 406, the PE router system controller 114 determines that a threshold utilization has not been reached or exceeded, then the method 400 returns to operation 404, where the PE router system controller 114 continues to monitor utilization of one or more of the switches 300, the central VM 316, one or more of the port VMs 318, or some combination thereof. If, however, at operation 406, the PE router system controller 114 determines that a threshold utilization has been reached or exceeded, then the method 400 proceeds to operation 408.

At operation 408, the PE router system controller 114 performs load balancing to reduce utilization of one or more of the switches 300, the central VM 316, one or more of the port VMs 318, or some combination thereof to below the threshold utilization. In some embodiments, load balancing is performed among two or more of the switches 300, two or more of the port VMs 318, the central VM 316 and another central VM (not shown), or some combination thereof. Moreover, load balancing can be performed in accordance with one or more policies, which can specify one or more preferences for instantiating new virtual components, utilizing existing virtual components, and balancing load between virtual and physical components (e.g., the switches 300).

From operation 408, the method 400 proceeds to operation 410. The method 400 ends at operation 410. The method 400 alternatively can be repeated.

Figure 5:
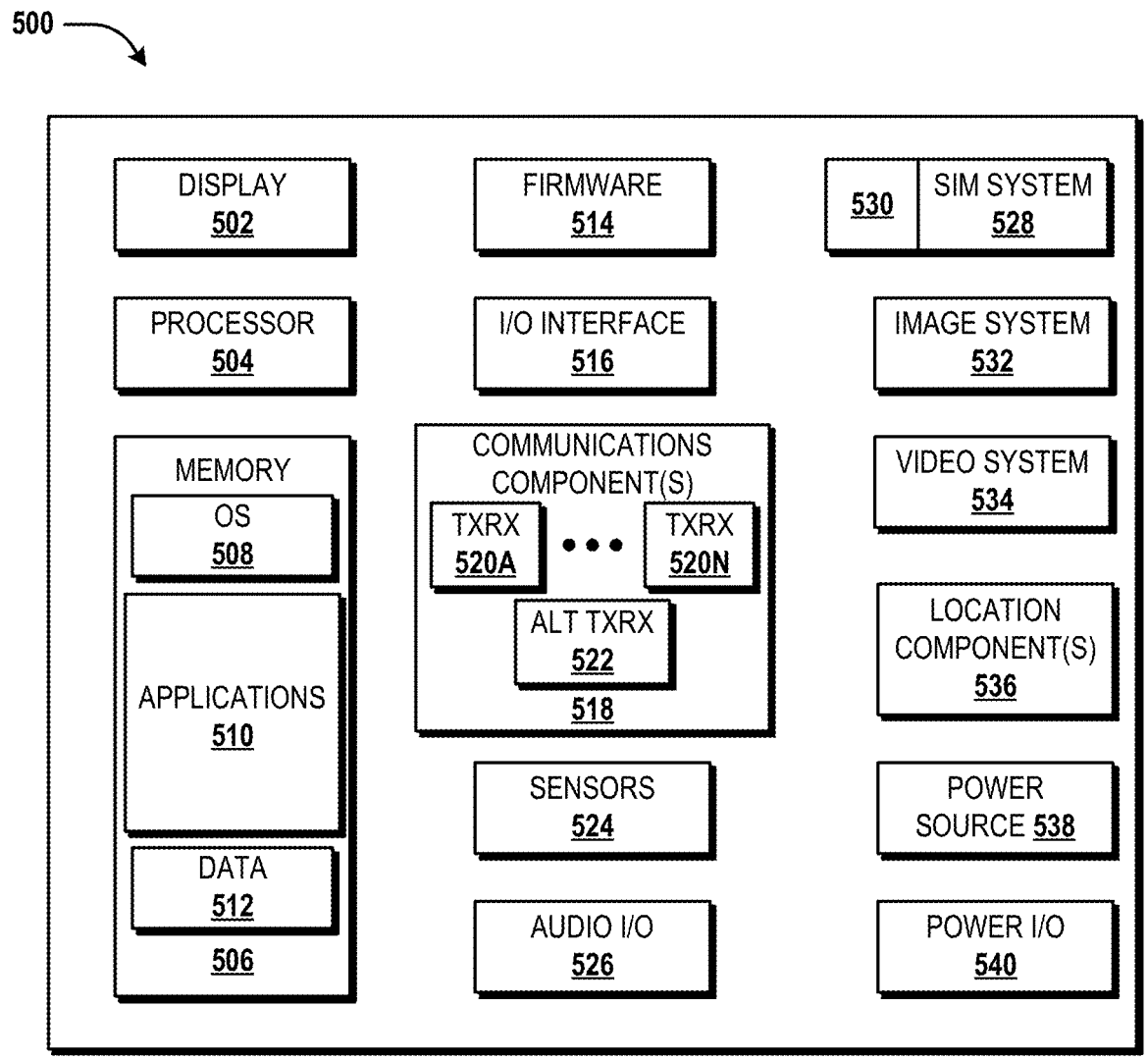
FIG. 5 is a block diagram illustrating an example mobile device capable of implementing aspects of the embodiments disclosed herein.

Turning now to FIG. 5, an illustrative mobile device 500 and components thereof will be described. While connections are not shown between the various components illustrated in FIG. 5, it should be understood that some, none, or all of the components illustrated in FIG. 5 can be configured to interact with one other to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in a memory 506, or the like. In some embodiments, the applications 510 also can include a user interface ("UI") application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in entering content, viewing account information, answering/initiating calls, entering/deleting data, entering and setting user IDs and passwords for device access, configuring settings, manipulating address book content and/or settings, multimode interaction, interacting with other applications 510, and otherwise facilitating user interaction with the operating system 508, the applications 510, and/or other types or instances of data 512 that can be stored at the mobile device 500. According to various embodiments, the data 512 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, user information, organization information, presence status information, user IDs, passwords, and application initiation (start-up) requests. In some embodiments, the I/O interface 516 can include a hardwire connection such as USB port, a mini-USB port, a micro-USB port, an audio jack, a PS2 port, an IEEE 1344 ("FIREWIRE") port, a serial port, a parallel port, an ethernet (RJ55) port, an RJ10 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments one or more of the transceivers of the communications component 518 may be configured to communicate using Global System for Mobile communications ("GSM"), Code Division Multiple Access ("CDMA") ONE, CDMA2000, Long-Term Evolution ("LTE"), and various other 2G, 2.5G, 3G, 4G, and greater generation technology standards. Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiplexing ("OFDM"), Space-Division Multiple Access ("SDMA"), and the like.

In addition, the communications component 518 may facilitate data communications using Generic Packet Radio Service ("GPRS"), Enhanced Data Rates for Global Evolution ("EDGE"), the High-Speed Packet Access ("HSPA") protocol family including High-Speed Download Packet Access ("HSDPA"), Enhanced Uplink ("EUL") or otherwise termed High-Speed Upload Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near-field communications ("NFC"), other radio frequency ("RF") technologies, combinations thereof, and the like.

In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, orientation sensors, noise sensors, proximity sensors, or the like. As such, it should be understood that the sensors 524 can include, but are not limited to, accelerometers, magnetometers, gyroscopes, infrared sensors, noise sensors, microphones, combinations thereof, or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to an MMS message, email message, and sent to another mobile device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from global positioning system ("GPS") devices, assisted GPS ("A-GPS") devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

Figure 6:
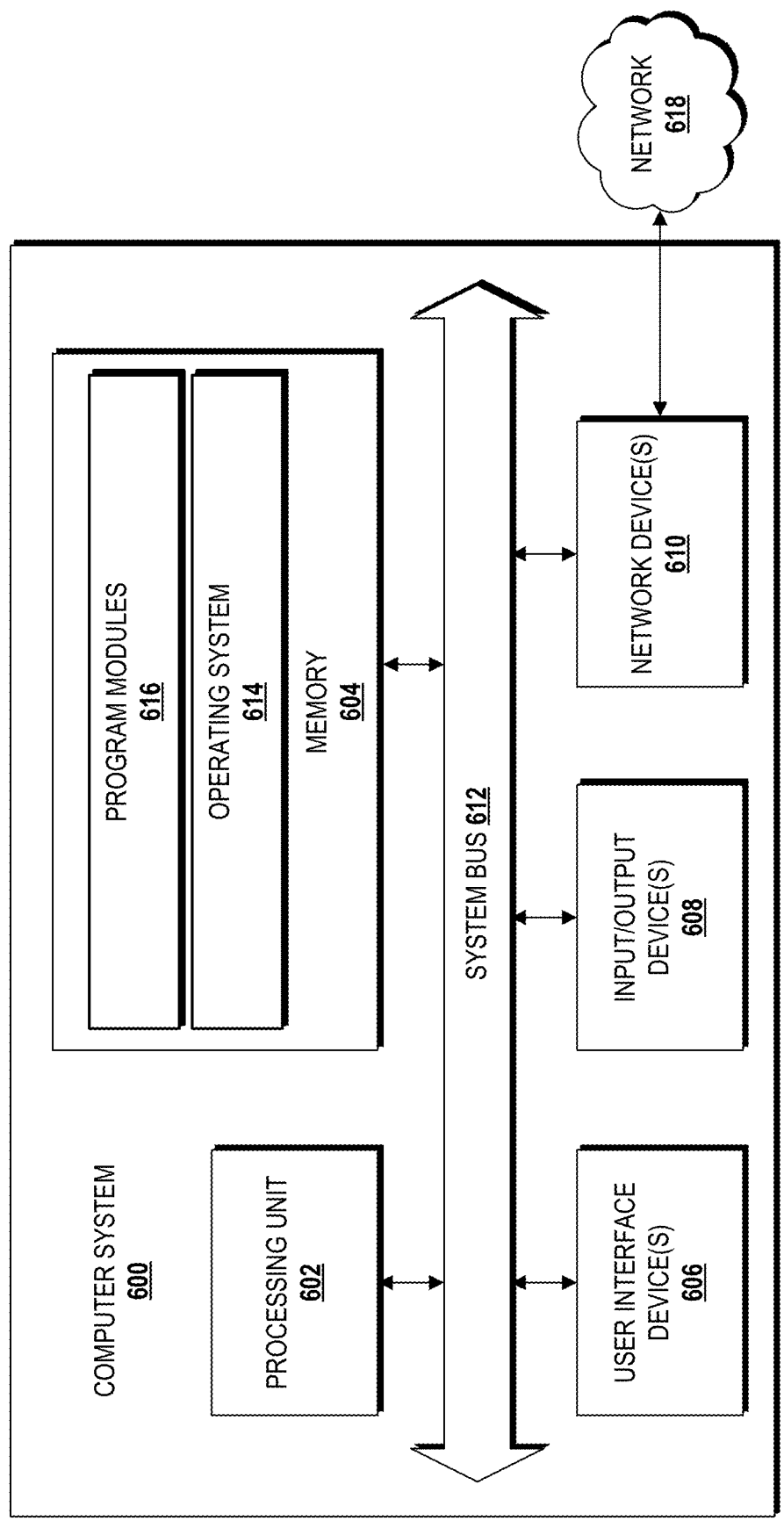
FIG. 6 is a block diagram illustrating an example computer system capable of implementing aspects of the embodiments presented herein.

FIG. 6 is a block diagram illustrating a computer system 600 configured to provide the functionality in accordance with various embodiments of the concepts and technologies disclosed herein. In some implementations, the hardware resources 304 (illustrated in FIG. 3) include one or more computers that are configured like the architecture of the computer system 600. The computer system 600 may provide at least a portion of the compute resources 310, the memory resources 312, and/or the other resources 314. The PE router system controller 114 may be configured like the architecture of the computer system 600. It should be understood, however, that modification to the architecture may be made to facilitate certain interactions among elements described herein.

The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein. The compute resources 310 (illustrated in FIG. 3) can include one or more processing units 602.

The memory 604 communicates with the processing unit 602 via the system bus 612. In some embodiments, the memory 604 is operatively connected to a memory controller (not shown) that enables communication with the processing unit 602 via the system bus 612. The memory resources 312 can include one or more instances of the memory 604. The illustrated memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 616 may include various software and/or program modules to perform the various operations described herein. The program modules 616 and/or other programs can be embodied in computer-readable media containing instructions that, when executed by the processing unit 602, perform various operations such as those described herein. According to embodiments, the program modules 616 may be embodied in hardware, software, firmware, or any combination thereof. The program modules 616 can include the VM monitors 306, the VMs 308, the VM creation module 320, the VM management module 322, the VM load balance module 324, the VM policy module 326, or a combination thereof.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, PDAs, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer. In some embodiments, the I/O devices 608 can be used for manual controls for operations to exercise under certain emergency situations.

The network devices 610 enable the computer system 600 to communicate with other networks or remote systems via a network 618, which can be or can include the network 104. Examples of the network devices 610 include, but are not limited to, a modem, a radio frequency ("RF") or infrared ("IR") transceiver, a telephonic interface, a bridge, a router, or a network card. The network 618 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 618 may be a wired network such as, but not limited to, a Wide Area Network ("WAN"), a wired Personal Area Network ("PAN"), or a wired Metropolitan Area Network ("MAN"). The network 618 may be any other network described herein.

Figure 7:
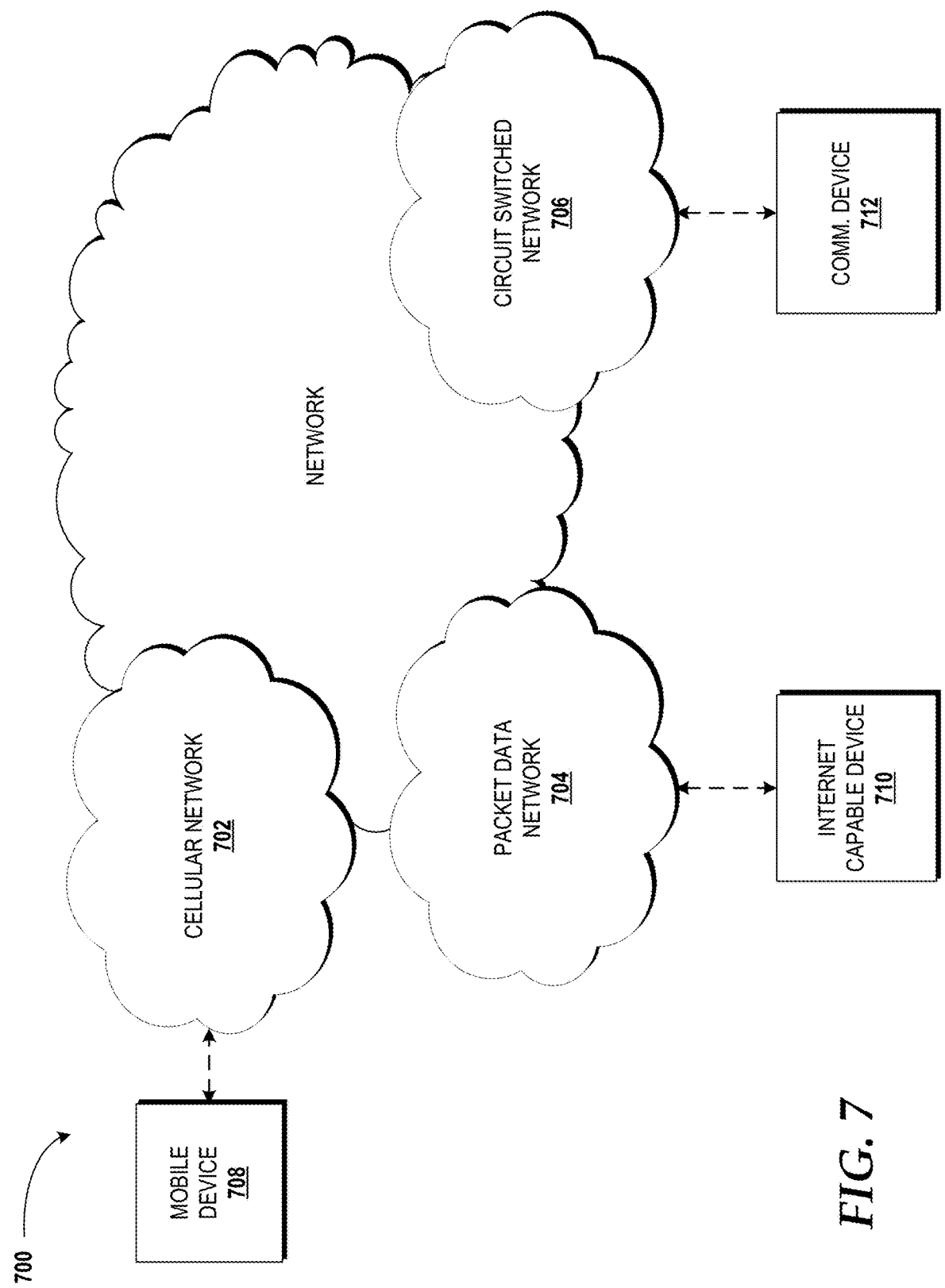
FIG. 7 is a diagram illustrating a network, according to an illustrative embodiment.

Turning now to FIG. 7, details of a network 700 are illustrated, according to an illustrative embodiment. The network 700 includes a cellular network 702, a packet data network 704, for example, the Internet, and a circuit switched network 706, for example, a PSTN. The cellular network 702 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 702 also includes radios and nodes for receiving and transmitting voice, data, and combinations thereof to and from radio transceivers, networks, the packet data network 704, and the circuit switched network 706.

A mobile communications device 708, such as, for example, a cellular telephone, a user equipment, a mobile terminal, a PDA, a laptop computer, a handheld computer, and combinations thereof, can be operatively connected to the cellular network 702. The cellular network 702 can be configured as a 2G GSM network and can provide data communications via GPRS and/or EDGE. Additionally, or alternatively, the cellular network 702 can be configured as a 3G UMTS network and can provide data communications via the HSPA protocol family, for example, HSDPA, EUL (also referred to as HSUPA), and HSPA+. The cellular network 702 also is compatible with 4G mobile communications standards such as LTE, or the like, as well as evolved and future mobile standards.

The packet data network 704 includes various devices, for example, servers, computers, databases, and other devices in communication with one another, as is generally known. The packet data network 704 can be or can include the network 104. The packet data network 704 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 704 includes or is in communication with the Internet. The circuit switched network 706 includes various hardware and software for providing circuit switched communications. The circuit switched network 706 may include, or may be, what is often referred to as a POTS. The functionality of a circuit switched network 706 or other circuit-switched network are generally known and will not be described herein in detail.

The illustrated cellular network 702 is shown in communication with the packet data network 704 and a circuit switched network 706, though it should be appreciated that this is not necessarily the case. One or more Internet-capable devices 710, for example, a PC, a laptop, a portable device, or another suitable device, can communicate with one or more cellular networks 702, and devices connected thereto, through the packet data network 704. It also should be appreciated that the Internet-capable device 710 can communicate with the packet data network 704 through the circuit switched network 706, the cellular network 702, and/or via other networks (not illustrated).

As illustrated, a communications device 712, for example, a telephone, facsimile machine, modem, computer, or the like, can be in communication with the circuit switched network 706, and therethrough to the packet data network 704 and/or the cellular network 702. It should be appreciated that the communications device 712 can be an Internet-capable device, and can be substantially similar to the Internet-capable device 710. In the specification, the network is used to refer broadly to any combination of the networks 702, 704, 706 shown in FIG. 7 and/or the network 104. It should be appreciated that substantially all of the functionality described with reference to the network 104 can be performed by the cellular network 702, the packet data network 704, and/or the circuit switched network 706, alone or in combination with other networks, network elements, and the like.

Based on the foregoing, it should be appreciated that concepts and technologies directed to a PE router system and a PE router system controller for hybrid virtualization of PE router functions have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A provider edge router system operating at a provider edge of a network, the provider edge router system comprising:
   an elastic computing system comprising
      a plurality of hardware resources comprising at least one processing unit and memory, and
      a plurality of virtual machines created by virtualizing at least a portion of the plurality of hardware resources, the plurality of virtual machines comprising a port virtual machine dedicated to a customer edge router operating at a customer edge of a customer network, wherein the port virtual machine provides an interface to the customer edge router and further provides a first set of operations;
   a plurality of switches of the network, wherein the plurality of switches provides a second set of operations, and wherein the plurality of switches are hardware components; and
   a provider edge router system controller comprising a plurality of modules that, when executed, cause the provider edge router system controller to perform operations comprising
      implementing a logical provider edge router for providing the customer edge router connectivity to the network, wherein the logical provider edge router is implemented via the port virtual machine dedicated to the customer edge router,
      managing routing functionality for the customer edge router by using a combination of the port virtual machine dedicated to the customer edge router and at least one of the plurality of switches, wherein managing the routing functionality for the customer edge router comprises causing route computation operations for traffic associated with the customer edge router to be performed by the port virtual machine dedicated to the customer edge router and causing forwarding operations for the traffic associated with the customer edge router to be performed by the at least one of the plurality of switches,
      receiving a load balancing parameter associated with a switch of the plurality of switches, wherein the load balancing parameter comprises a threshold utilization associated with the switch, monitoring utilization of the plurality of switches, determining, based at least in part on monitoring the utilization of the plurality of switches, that the utilization of the switch exceeds the threshold utilization of the load balancing parameter, in response to determining that the utilization of the switch exceeds the threshold utilization of the load balancing parameter, performing load balancing to reduce the utilization of the switch, wherein performing the load balancing comprises utilizing the port virtual machine to balance the utilization of the switch between the port virtual machine and the switch, prior to the logical provider edge router failing, determining that a failure of the logical provider edge router is possible, and in response to determining that a failure of the logical provider edge router is possible prior to the logical provider edge router failing, extracting customer configuration information associated with a customer of the customer edge router from the logical provider edge router, instantiating a new logical provider edge router by instantiating a new port virtual machine dedicated to the customer edge router, installing the customer configuration information onto the new logical provider edge router to configure the new logical provider edge router to communicate with the customer edge router according to the customer configuration information, and reconfiguring connectivity of the network to incorporate the new logical provider edge router.

2. The provider edge router system of claim 1, wherein the route computation operations utilize, at least in part, a routing table.

3. The provider edge router system of claim 1, wherein the route computation operations utilize, at least in part, a routing protocol state.

4. The provider edge router system of claim 1, wherein the plurality of virtual machines further comprise a centralized virtual machine that performs a third set of operations.

5. The provider edge router system of claim 4, wherein the third set of operations comprise route processing operations.

6. The provider edge router system of claim 1, wherein the load balancing is performed in accordance with a policy.

7. The provider edge router system of claim 1, wherein reconfiguring connectivity of the network to incorporate the new logical provider edge router comprises reconfiguring the connectivity of the network to incorporate the new logical provider edge router in place of the logical provider edge router.

8. A provider edge router system controller comprising:
a processing unit; and
a memory comprising instructions that, when executed by the processing unit, cause the processing unit to perform operations comprising
implementing a logical provider edge router at a provider edge of a network for providing a customer edge router operating at a customer edge of a customer network connectivity to the network, wherein the logical provider edge router is implemented via a port virtual machine dedicated to the customer edge router, wherein the port virtual machine provides an interface to the customer edge router, and wherein the port virtual machine is created by virtualizing at least a portion of a plurality of hardware resources, managing routing functionality for the customer edge router by using a combination of the port virtual machine dedicated to the customer edge router and a switch of the network, wherein managing the routing functionality for the customer edge router comprises causing route computation operations for traffic associated with the customer edge router to be performed by the port virtual machine dedicated to the customer edge router and causing forwarding operations for the traffic associated with the customer edge router to be performed by the switch of the network, wherein the switch is a hardware component, receiving a load balancing parameter associated with the switch, wherein the load balancing parameter comprises a threshold utilization associated with the switch, monitoring utilization of the switch, determining, based at least in part on monitoring the utilization of the switch, that the utilization of the switch exceeds the threshold utilization of the load balancing parameter, in response to determining that the utilization of the switch exceeds the threshold utilization of the load balancing parameter, performing load balancing to reduce the utilization of the switch, wherein performing the load balancing comprises utilizing the port virtual machine to balance the utilization of the switch between the port virtual machine and the switch, prior to the logical provider edge router failing, determining that a failure of the logical provider edge router is possible, and in response to determining that a failure of the logical provider edge router is possible prior to the logical provider edge router failing, extracting customer configuration information associated with a customer of the customer edge router from the logical provider edge router, instantiating a new logical provider edge router by instantiating a new port virtual machine dedicated to the customer edge router, installing the customer configuration information onto the new logical provider edge router to configure the new logical provider edge router to communicate with the customer edge router according to the customer configuration information, and reconfiguring connectivity of the network to incorporate the new logical provider edge router.

9. The provider edge router system controller of claim 8, wherein the operations of the processing unit further comprise detecting the failure of the logical provider edge router.

10. The provider edge router system controller of claim 8, wherein the operations of the processing unit further comprise testing a connection to the customer associated with the customer configuration information.

11. The provider edge router system controller of claim 8, wherein the load is performed in accordance with a policy.

12. The provider edge router system controller of claim 8, wherein reconfiguring connectivity of the network to incorporate the new logical provider edge router comprises reconfiguring the connectivity of the network to incorporate the new logical provider edge router in place of the logical provider edge router.

13. A computer-readable storage medium comprising computer-executable instructions that, when executed by a processing unit of a provider edge router system controller, cause the provider edge router system controller to perform operations comprising:
implementing a logical provider edge router at a provider edge of a network for providing a customer edge router operating at a customer edge of a customer network connectivity to the network, wherein the logical provider edge router is implemented via a port virtual machine dedicated to the customer edge router, wherein the port virtual machine provides an interface to the customer edge router, and wherein the port virtual machine is created by virtualizing at least a portion of a plurality of hardware resources;
managing routing functionality for the customer edge router by using a combination of the port virtual machine dedicated to the customer edge router and a switch of the network, wherein managing the routing functionality for the customer edge router comprises causing route computation operations for traffic associated with the customer edge router to be performed by the port virtual machine dedicated to the customer edge router and causing forwarding operations for the traffic associated with the customer edge router to be performed by the switch of the network, wherein the switch is a hardware component;
receiving a load balancing parameter associated with the switch, wherein the load balancing parameter comprises a threshold utilization associated with the switch;
monitoring utilization of the switch;
determining, based at least in part on monitoring the utilization of the switch, that the utilization of the switch exceeds the threshold utilization of the load balancing parameter;
in response to determining that the utilization of the switch exceeds the threshold utilization of the load balancing parameter, performing load balancing to reduce the utilization of the switch, wherein performing the load balancing comprises utilizing the port virtual machine to balance the utilization of the switch between the port virtual machine and the switch;
prior to the logical provider edge router failing, determining that a failure of the logical provider edge router is possible; and
in response to determining that a failure of the logical provider edge router is possible prior to the logical provider edge router failing,
extracting customer configuration information associated with a customer of the customer edge router from the logical provider edge router,
instantiating a new logical provider edge router by instantiating a new port virtual machine dedicated to the customer edge router,
installing the customer configuration information onto the new logical provider edge router to configure the new logical provider edge router to route packets to communicate with the customer edge router according to the customer configuration information, and
reconfiguring connectivity of the network to incorporate the new logical provider edge router.

14. The computer-readable storage medium of claim 13, wherein the operations of the provider edge router system controller further comprise detecting the failure of the logical provider edge router.

15. The computer-readable storage medium of claim 13, wherein the load balancing is performed in accordance with a policy.

16. The computer-readable storage medium of claim 13, wherein reconfiguring the connectivity of the network to incorporate the new logical provider edge router comprises reconfiguring connectivity of the network to incorporate the new logical provider edge router in place of the logical provider edge router.

* * * * *